United States Patent [19]

Pennewiss et al.

[11] Patent Number: 4,677,151

[45] Date of Patent: Jun. 30, 1987

[54] CONCENTRATED EMULSIONS OF OLEFIN COPOLYMERS

[75] Inventors: Horst Pennewiss, Darmstadt-Neu-Kranichstein; Roland Schweder, Darmstadt-Kranichstein; Wolfgang Tschepat, Darmstadt, all of Fed. Rep. of Germany

[73] Assignee: Röhm GmbH, Darmstadt, Fed. Rep. of Germany

[21] Appl. No.: 740,304

[22] Filed: Jun. 3, 1985

Related U.S. Application Data

[63] Continuation of Ser. No. 468,184, Feb. 22, 1983, abandoned.

[30] Foreign Application Priority Data

Mar. 1, 1982 [DE] Fed. Rep. of Germany ....... 3207291

[51] Int. Cl.$^4$ .............................................. C08J 3/02
[52] U.S. Cl. .................... 524/501; 524/923; 585/3; 585/12; 252/308; 252/351; 252/356
[58] Field of Search ....................... 252/308, 351, 356; 524/501, 923; 585/3, 12

[56] References Cited

U.S. PATENT DOCUMENTS 3,595,789  7/1971  Coshburn .............................. 585/12
3,607,821  9/1971  Clarke et al. ........................ 260/84.2
4,290,925  9/1981  Pennewiss ............................. 252/56

FOREIGN PATENT DOCUMENTS 1570771  12/1969  Fed. Rep. of Germany .
2258966   6/1973  Fed. Rep. of Germany .
2905954  10/1982  Fed. Rep. of Germany .
2126747  10/1972  France .
2185656   1/1974  France .
1388381   3/1974  United Kingdom .
1429934   3/1976  United Kingdom .

Primary Examiner—Morton Foelak
Assistant Examiner—Garnette D. Draper
Attorney, Agent, or Firm—Curtis, Morris & Safford

[57] ABSTRACT

What are disclosed are a method for making a concentrated emulsion of an olefin copolymer in a carrier medium suitable for use in oil additives, without previous dissolution of the olefin copolymers, by preparing a solution of an emulsifier of the type

A—X, wherein A represents a sequence or segment of an olefin copolymer, of hydrogenated polyisoprene, or of an hydrogenated butadiene/isoprene copolymer, and X represents a sequence or segment composed of polyacrylate and/or polymethacrylate, in a carrier medium which does not substantially dissolve the olefin copolymers but does dissolve the X sequences, and then emulsifying an olefin copolymer in the solution of the emulsifier in the carrier medium at a temperature from 40° C. to 150° C. with the use of shearing forces, as well as emulsions made by such a method.

10 Claims, No Drawings

CONCENTRATED EMULSIONS OF OLEFIN COPOLYMERS

This application is a continuation of application Ser. No. 468,184, filed Feb. 22, 1983, abandoned.

The present invention relates to concentrated emulsions of olefin copolymers in a carrier medium which does not dissolve olefin copolymers, which emulsions are suitable for use as lubricating oil additives, particularly together with acrylic resins, and to methods for making the same.

Two classes of polymers, namely oil soluble olefin copolymers (OCP), and in particular ethylene/propylene copolymers, and oil soluble polymers based on polyalkyl acrylates and methacrylates (PAMA), are widely used as lubricating oil additives since they improve the viscosity/temperature behavior of multigrade mineral oils. Apart from their thickening action, such viscosity index improvers must have adequate shear stability. Viscosity index improvers are further expected to have good dispersing or detergent action toward cold sludge and dirt which deposits in engines. Both product classes have advantages and disadvantages. Polyolefins have excellent thickening action but no appreciable pour point depressant effect so that pour point improvers must be added. Polyalkyl methacrylate additives impart to mineral oils a good viscosity/temperature behavior and, when sufficiently concentrated, excellent wear protection. They are also noted for their pour point depressant effect.

What militates against combining the two types of polymers for simultaneous use in mineral oils is their incompatibility. Industry demands lubricating oil additives in liquid form (on a mineral oil basis) which have as high a polymer content as possible. However, the two polymer types together are soluble in mineral oil without difficulty only when one polymer type definitely predominates in terms of quantity, that is the other polymer type should not amount to more than 5 weight percent, based on the total polymer content. If this limit is exceeded, phase separation will occur in the polymers, and this can result in the formation of layers during extended storage.

Published German patent application No. 29 05 954 (=U.S. Pat. No. 4,290,925) discloses concentrated polymer emulsions of polyacrylates or methacrylates (PAMA) and olefin copolymers (OCP) in mineral oil which are suitable for viscosity index improvement. The emulsion contains polyacrylates or polymethacrylates with a defined, low molecular weight range as the continuous phase, an OCP with a molecular weight that is complementary with respect to thickening action as the disperse phase, a carrier medium which is a good solvent for PAMA (and, because of the PAMA dissolved therein, a far less efficient solvent for OCP), as well as a graft and/or block polymer of olefin copolymers and acrylate and/or methacrylate esters as a stabilizing agent for the phase distribution. The highest OCP-to-PAMA ratio obtainable in accordance with said German patent application (claim 4) is 60:40. The carrier medium may further contain solvents having less solvent power for OCP, for example solvents comprising an ester or alcohol.

A major reason for the poor solubility is the incompatibility of the OCP phase with the PAMA phase: since the mineral oil contained in the carrier medium dissolves both phases about equally well, an approximately even distribution between the two phases results.

The present invention proceeds from these prior art olefin copolymers as a point of departure.

The teachings of published German patent application No. 29 05 954 and U.S. Pat. No. 4,290,925 represent a solution tailored to the system OCP/PAMA in mineral oil, which solution requires a number of parameters to be observed. Generally the OCP, present in solid form, is first dissolved in mineral oil. The emulsifier, usually prepared in situ and consisting of a graft and/or block polymer of OCP and acrylate or methacrylate ester, is then added. The amount of emulsifier, required to stabilize the phases, should not be less than 5 weight percent based on the total polymer. On the other hand, too high a percentage of graft polymer as a stabilizer/emulsifier tends to reduce the effectiveness of viscosity index improvers.

Thus, there has been a need for providing emulsions of olefin copolymers which have far broader uses than those of the prior art. With regard to the emulsifiers, too, a greater degree of flexibility than that available with prior art systems was sought, together with a reduction in the amount of emulsifier required. Being able to prepare a concentrated emulsion of the OCP directly, that is to say without an intermediate dissolving step, would offer advantages. The concentrated emulsions so prepared would have to be miscible with acrylic resins of the types used in viscosity index improvers, pour point depressants, etc., and preferably would be compatible with other lubricating oil additive components.

A feature of the present invention is a method for making a concentrated emulsion of an OCP in a carrier medium suitable for use as an oil additive, without prior solution of the OCP, which comprises first preparing a solution of a certain type of emulsifier in a carrier medium in which the OCP is essentially insoluble, and then dispersing the OCP in the solution at temperature from 40° C. to 150° C. with shearing forces. The emulsifier used in this process is of the formula $$A-X,$$

wherein A represents a sequence or segment of an OCP, of hydrogenated polyisoprene, or of an hydrogenated copolymer of butadiene/isoprene, and X represents polyacrylate and/or polymethacrylate sequences which are soluble in the carrier medium.

The concentrated OCP emulsions prepared in accordance with the invention generally contain from 20 to 65 weight percent, and preferably over 30 weight percent, of OCP.

In contrast to the prior art, the carrier medium to be used is not a solvent or solvent combination which, because of the polyacrylate or polymethacrylate esters dissolved therein, is a poor solvent for the OCP phase. Rather, poor solubility is due solely to the chemical and physical properties of the OCP polymer and of the solvent themselves.

The emulsifiers effective in accordance with the invention correspond to the type $$A-X,$$

wherein A is a sequence or segment of an olefin copolymer, of hydrogenated polyisoprene, or of an hydrogenated butadiene/isoprene copolymer. The olefin copolymers corresponding to A which are to be used in accordance with the invention are known per se. They are primarily polymers composed of ethylene, propylene, butylene, and/or other alpha olefins having from 5 to 20 carbon atoms which have already been proposed as viscosity index improvers. Their molecular weight generally ranges from 10,000 to 300,000, and preferably from 50,000 to 150,000. Such olefin copolymers are described in published German patent applications DOS Nos. 16 44 941, 17 69 834, 19 39 037, 19 63 039 and 20 59 981, for example. When A is a segment of an hydrogenated polyisoprene, commercially available block copolymers comprising a selectively hydrogenated polyisoprene/polystyrene (such as the commercial product "SHELLVIS 50") are preferred.

Ethylene/propylene copolymers are particularly suitable for use. Terpolymers incorporating known ter components such as ethylidene-norbornene [see Macromolecular Reviews 10 (1975)] may also be used, but their tendency to crosslink upon aging must be taken into account. The distribution may be largely statistical. However, sequence polymers with ethylene blocks may also be used, and to advantage. The ratio between the monomers ethylene and propylene is variable within certain limits, the upper limit being about 75% for ethylene and about 80% for propylene. Because of its reduced solubility in oil, even polypropylene is less well suited than are ethylene/propylene copolymers.

Segment X in the formula by definition is formed of polyacrylate and/or polymethacrylate sequences which in themselves, for example in the form of a corresponding homopolymer or copolymer, are soluble in the carrier medium employed. Segment X generally is composed to the extent of over 50 weight percent, and preferably from 80 to 100 weight percent, based on segment X, of monomers of the formula

 (II)

wherein $R_1$ represents hydrogen or methyl and $R_2$ is alkyl having from 1 to 30 carbon atoms, and preferably from 1 to 20 carbon atoms. Segment X may further contain monomers of the formula

 (III)

wherein $R'_1$ represents hydrogen or methyl and Z is —$COR_3$,

—$OCR_3$,

—$OR_4$, or a chlorine atom, wherein $R_3$ and $R_4$ represent linear or branched alkyl having from 1 to 20 carbon atoms, or phenyl, and n is 0 or 1.

Instead of the last-mentioned monomers, or in addition thereto, X may contain monomers of the formula

 (IV)

wherein $R_5$ and $R_8$ represent hydrogen or —$COOR_7'$, and $R_6$ is hydrogen or —$CH_2COOR_7''$, a requirement being that the compound contain two ester groups, and wherein $R_7$, $R_7'$, and $R_7''$ represent linear or branched alkyl having from 1 to 20 carbon atoms.

Optionally the segment X may further contain monomers of the formula

 (V)

wherein $R_1''$ has the meaning of $R_1$ and $B_s$ represents a nitrogen-containing functional group such as a —C≡N group or a —$CONR_9R_{10}$ group, wherein $R_9$ and $R_{10}$, taken alone, signify hydrogen or alkyl having from 1 to 20 carbon atoms, or wherein $R_9$ and $R_{10}$, taken together with the nitrogen atom to which they are bound, form a heterocyclic five- or six-membered ring. $B_s$ may also represent an inert heterocyclic group, and in particular a pyridine, pyrolidine, imidazole, carbazole, or lactam group, or alkylated derivatives thereof. Or $B_s$ has the meaning —$CH_2OH$. $B_s$ may also have the meaning

—COO—Q—$R_{11}$, wherein Q represents unsubstituted or alkyl-substituted alkylene having from 2 to 8 carbon atoms, and $R_{11}$ is —OH, —$OR_7'''$, or —$NR_9'R_{10}'$, $R_7'''$, $R_9'$, and $R_{10}'$ having the same meanings as $R_7$, $R_9$ and $R_{10}$, the last-mentioned two, taken together, forming a five- or six-membered heterocyclic ring together with the nitrogen atom, for example, optionally with inclusion of a further hetero atom.

Examples of monomers of formulas (III) and (IV) are, in particular, styrene, alpha-methylstyrene, vinyl chloride, vinyl acetate, vinyl stearate, vinyl methyl ketone, vinyl isobutyl ether, allyl acetate, allyl chloride, allyl isobutyl ether, allyl methyl ketone, dibutyl maleate, dilauyryl maleate, and dibutyl itaconate.

The amount of monomers of the formulas (III) to (V) in segment X generally ranges from 0 to 50 weight percent, and preferably from 0 to 20 weight percent, based on the monomers of segment X. The proportion of the monomers of formula (V) in segment X will generally not exceed 20 weight percent; as a rule it will range from 0 to 10 weight percent, and preferably from 0 to 5 weight percent.

In a particular case, segment X will be selected, with respect to its proportions and composition, with due regard to the desired technical function of the system. Thus, segment X, like segment A, will have to meet specific requirements to be optimally suited for use as a viscosity index improver for mineral oils. The stability of the emulsion will be particularly good if the molecular weight of segment A is at least equal to the molecular weight of the OCP to be emulsified and if the molecular weight of segment X is about 20,000.

In the present case, a requirement is that segment X, too, be adequately soluble in mineral oils. The proportion of polar monomers of formula (V) in this case will not exceed 20 weight percent and preferably ranges from 0 to 10 weight percent, based on the monomers of segment X, and still more preferably from 0 to 5 weight percent. Typical monomers of formula (V) are C- and N-vinylpyridine, as well as vinyl-pyrrolidine, vinylpyrrolidone, vinylcarbazole, and vinylimidazole, for example, and particularly N-vinyl compounds, and also the hydroxyalkyl and dialkylaminoalkyl esters of acrylic or methacrylic acid, and particularly dimethylaminoethyl acrylate and methacrylate, dimethylaminopropyl acrylate and methacrylate, and hydroxyethyl acrylate and methacrylate.

The weight ratio of segments A and X generally ranges from 1:20 to 20:1 and preferably ranges from 1:4 to 1:1.

In general, the concentrated OCP emulsions in accordance with the invention contain the emulsifier AX in concentrations ranging from 1 to 50 weight percent, and preferably from 5 to 15 weight percent. When the concentrated emulsions of the invention are intended for end uses other than as viscosity index improvers, segment X can be appropriately adapted to the intended use.

As a rule, the emulsifier is prepared in advance in a separate step. The methods of preparing suitable emulsifiers of the type A-X are known per se. Thus, the method used may be transfer grafting, for example. [See also Houben-Weyl, "Methoden der Org. Chemie", vol. 14/1, page 114; H. A. J. Battaerd and G. W. Tregear, "Polymer Reviews", 16, Interscience (1967).]

For this purpose, a 10 to 20% solution of an OCP is prepared in a suitable solvent which is inert under polymerization conditions. Advantageously a solvent system is used such that the emulsifier dissolved therein can be readily added to the carrier medium in the present process. This means that the boiling point will have to be above the process temperature. Suitable solvents are butyl acetate, trimethyladipate octyl ester, pentaerythritol tetraadipate ester, and the like. The monomers of formulas (II) to (V) are added to these solutions in the ratios indicated and polymerized with the addition of one or more preferably peroxidic free-radical initiators at temperatures between 60° and 150° C., usually within from 4 to 8 hours. As nearly complete conversion as possible is desirable. Per-esters such as tert-butyl peroctoate are preferably used. The initiator concentration depends on the number of desired grafting sites and on the desired molecular weight of segment X. The initiator concentration generally ranges from 0.2 to 3 weight percent, based on the polymer. Optionally, chain transfer agents may be used for adjustment of the desired molecular weight of the X segments. Suitable agents are organosulfur modifiers, for example, and in particular agents containing mercapto groups, for example dodecyl mercaptan. The concentration of chain transfer agent generally ranges from 0.1 to 1.0 weight percent, based on the total polymer. A further method of preparing the emulsifiers AX involves the hydroperoxidation of an OCP as a first step. The hydroperoxide groups so formed in the chain can then initiate in a succeeding step the graft polymerization of the vinyl monomers. (See H. A. J. Battaerd and G. W. Tregear, Polymer Reviews, loc. cit.)

One method of preparing suitable block polymers is anionic polymerization. Isoprene or butadiene, for example, is polymerized with an appropriate anionic initiator (an organometallic compound, for example) and the "living" anionic chain ends are reacted with alkyl xethacrylate, for example. The polymers so produced are then hydrogenated under conditions under which the functional groups present are not attacked. For details of preparation, reference is made to the pertinent literature, for example Houben-Weyl, "Methoden der Org. Chemie", 14/1, pp. 110 et seq.; "Block Copolymers", by D. C. Allport and W. H. Janes, Appl. Sci. Publishers Ltd., London, 1972; "Graft Copolymers" by H. A. J. Battaerd and G. W. Tregear, Polymer Reviews, 16 (1967); "Block and Graft Polymers", by W. J. Burlant and A. S. Hoffmann, Reinhold Publishing Corp., New York, 1960.

The liquid carrier medium used is, by definition, one which causes the olefin copolymers to swell to a degree of from 5 to 300 weight percent, the so called degree of swelling, in the 40° to 150° C. temperature range. The degree of swelling is determined as follows: An OCP film 1 mm thick, 2 cm long, and 0.5 cm wide and of known weight is immersed in the solution at a specified temperature (see below), which in the case of the Example is 90° C., and so maintained for 24 hours at constant temperature. Then it is removed from the solution with tweezers, freed of adhering swelling agent with filter paper, and immediately weighed. The increase in weight, as a percentage of the initial weight, constitutes the measure of swelling. Swelling should be measured at the temperature at which the concentrated OCP emulsion is to be prepared. In accordance with the invention, the swelling at said temperature should be in the 5 to 300 percent range. A requirement for the applicability of this criterion is that maximum swelling of the OCP is obtained under the conditions indicated above.

The solvents which can be used as liquid carrier media in accordance with the invention should be inert and generally harmless. Carrier media which meet these requirements may be esters, for example, and/or higher alcohols. As a rule, the types of compounds suitable for use as a carrier medium contain more than 8 carbon atoms per molecule.

Particularly well suited among the esters are those of phosphoric acid, esters of dicarboxylic acids, esters of monocarboxylic acids with diols or polyalkylene glycols, and esters of neopentyl polyols with monocarboxylic acids. [See Ullmanns "Enzyklopaedie der Technischen Chemie", 3rd ed., vol. 15, pp., 287–292, Urban & Schwarzenberg (1964).] Suitable esters of dicarboxylic acids are, for example, the phthalate esters, and particularly phthalate esters with $C_4$ to $C_8$ alcohols, and more particularly dibutyl phthalate and dioctyl phthalate, as well as the esters of straight chain dicarboxylic acids with branched chain primary alcohols. The esters of sebacic, adipic, and azelaic acid, and particularly the 2-ethylhexyl and isooctyl-3,5,5-trimethyl esters as well the esters with $C_8$, $C_9$ and $C_{10}$ oxo alcohols, are especially suitable.

The esters of straight chain primary alcohols with branched dicarboxylic acids are of particular importance. An example is alkyl-substituted adipic acid, for example 2,2,4-trimethyladipic acid.

The alcohol component may advantageously comprise the oxo alcohols mentioned above, for example. Among the esters of monocarboxylic acids with diols or polyalkylene glycols, the diesters with diethylene glycol, triethylene glycol, tetraethylene glycol to decamethylene glycol, and also with dipropylene glycol as the alcohol component, are particularly suitable. Of the monocarboxylic acids, propionic acid, butyric or isobutyric acid, and pelargonic acid, and especially dipropylene glycol dipelargonate, diethylene glycol dipropionate and diisobutyrate, as well as the corresponding esters of triethylene glycol and tetraethylene glycol di-2-ethyl-hexanate ester, are particularly suitable for use.

Mixtures of the above solvents may also be used as a carrier medium. The carrier medium usually is from 79 to 25 weight percent, and preferably less than 70 weight percent, and more particularly from 60 to 40 weight percent, of the concentrated polymer emulsion.

The concentrated emulsions of olefin copolymers in a carrier medium in accordance with the invention may be grafted with further monomers, for example, those defined in connection with the preparation of the emulsifiers under the formulas (II), (III), (IV), and (V).

Particularly well suited for this purpose are, for example, styrene, alpha-methylstyrene, vinyl esters such as vinyl acetate, and esters of acrylic and/or methacrylic acid with $C_1$ to $_{30}$ alcohols, the latter especially in view of viscosity index improvement as an end use. Grafting with the polar monomers of formula (V), and particularly with N-vinyl-pyrrolidone, N-vinylimidazole, N-vinylpyridine, N-vinyl-carbazole, and 2-dimethylaminoethyl methacrylate is also of special importance in this connection. In addition to stability improvement, other desired properties such as pour point improving as well as dispersing and detergent action can thus be obtained. Moreover, the OCP dispersions can be mixed with the type of polymer which corresponds to the soluble emulsifier component (X in AX), these polymers then passing into the continuous phase. The preferred use of the concentrated OCP emulsions of the invention is in the area of viscosity index improvers. However, they will find use also in other industrial fields. There have been no concentrated OCP dispersions having dispersing and pour point depressing action on the market up to now, but only dilute (not more than 15%) solutions of olefin copolymers in mineral oil.

The concentrated OCP emulsions of the invention are of special interest if they have been grafted with monomers of formula (V). In that form, they are oil additives having dispersing, detergent and pour point depressing action which are superior to those of the prior art. By comparison with olefin graft polymers produced in solution, higher grafting yields can be obtained in accordance with the invention. For example, by proceeding as when grafting in solution, the grafting step can be carried out without the expenditures which have been unavoidable up to now. (See Houben-Weyl, loc. cit.)

A better understanding of the present invention will be had by referring to the following examples, given by way of illustration. The emulsifiers used in the examples were prepared as follows.

Preparation of an emulsifier AX1

The following mixture was charged to a 1-liter four necked flask equipped with a stirrer, thermometer, reflux condenser, and feed line:
280 g of pentaerythritol tetracaprate,
84 g of an ethylene/propylene copolymer (50% ethylene, molecular weight=80,000, U*=0.8), and
40.4 g of a methacrylate ester of a $C_{12}$ to $C_{18}$ alcohol mixture.
*U=(wt. avg. mol. wt)/(no. avg. mol. wt.)−1

After dissolving these components under a nitrogen atmosphere at 95° C., 4 g of tert-butyl peroctoate were added. A mixture of
236.5 g of a methacrylate ester of a $C_{12}$ to $C_{18}$ alcohol mixture,
59.1 g of methacrylate methyl ester, and
11.8 g of tert-butyl peroctoate
was then fed in at a uniform rate over a period of 3.5 hours.

Two hours after the end of the feed, 0.84 g of tert-butyl peroctoate was added.

Total polymerization time: 8 hours. A clear, viscous solution was obtained. Polymer content: 60 weight percent. Viscosity at 100° C.: 1,200 mm$^2$/sec Viscosity (3% in mineral oil), $\eta_{100° C.}$=5.3 mm$^2$/sec);
7.06 mm$^2$/sec at 100° C.;
42.00 mm$^2$/sec at 40° C.
$VI_B$**=128
**$VI_B$=viscosity index measured according to DIN 150 2909

Preparation of an emulsifier AX2

84 g of ethylene/propylene copolymer (50% ethylene, molecular weight=80,000, U=0.8) were dissolved in 280 g of butyl acetate at 100° C. in a 1-liter Witt jar equipped with heavy duty shear stirrer (diameter ratio of stirrer/jar: 0.7), thermometer, and reflux condenser. 40.4 g of a mixture of 70% of methacrylic acid methyl ester and 30% of acrylic acid butyl ester were then added under a nitrogen atmosphere. At 100° C., 1 g of tert-butyl peroctoate was added, and a mixture of
207.5 g of methacrylic acid methyl ester,
88.8 g of acrylic acid butyl ester, and
3 g of tert-butyl peroctoate
was fed in at a uniform rate over a period of 3.5 hours. Two hours after the end of the feed, 0.7 g of tert-butyl peroctoate was added. Total polymerization time: 8 hours.

A turbid, viscous solution was obtained. Polymer content: 60 weight percent.

Preparation of emulsions

EXAMPLE 1

Carrier medium: Dibutyl phthalate
OCP swelling: 20% at 90° C.
Emulsifier: AX1

342 g of dibutyl phthalate and 37.5 g of emulsifier AX1 were charged into a 1-liter Witt jar equipped with a heavy duty shear stirrer (diameter ratio of stirrer/jar: 0.7; two circuit breakers; stirrer speed, about 450 rpm). 370.5 g of granulated OCP (a 1:1 mixture of ethylene propylene copolymers with 70% and 50% ethylene, respectively, both degraded thermally and oxidatively from a molecular weight of about 150,000 to a molecular weight of about 100,000) were then added in portions, with stirring, at 110° C. under an $N_2$ atmosphere. Dispersing time: 4 to 5 hours. 26.8 g of 2-dimethylaminoethyl methacrylate were then added and grafting was carried out at 100° C. with the addition of 1 g of tert-butyl peroctoate. Two 0.5 g portions of tert-butyl peroctoate were added at 1 hour intervals. A mixture of 116 g of a methacrylate ester of a $C_{12}$ to $C_{18}$ alcohol mixture and 81.3 g of dibutyl phthalate was then added, followed by polymerization, again at 100° C., with the addition of 1.3 g of tert-butyl peroctoate. Two 0.67 g portions of tert-butyl peroctoate were added, again at 1 hour intervals.

A turbid viscous emulsion was obtained. Under a phase-contrast microscope, round OCP particles of a diameter ranging from 1 to 10 microns were discernible.

Polymer content: 55 weight percent
Viscosity at 5 s$^{-1}$ shear gradient:
25° C. = 4,300 mm$^2$/sec
40° C. = 1,750 mm$^2$/sec
60° C. = 1,000 mm$^2$/sec
100° C. = 1,250 mm$^2$/sec
N content of isolated polymer = 0.23 weight percent.
Viscosity (2.6% in mineral oil with $\eta_{100°\ C.}$ = 5.3 mm$^2$/sec):
14.83 mm$^2$/sec at 100° C.;
102.20 mm$^2$/sec at 40° C.
VI$_B$ = 154
SSI* (2.6% in mineral oil with $_{100°\ C.}$ = 5.3 mm$^2$/sec) = 44

*SSI = shear-stability index = loss in thickening action, in percent, during shear-stability test in conformity with DIN 51382.

Pour point (2.6% in mineral oil with $_{100°\ C.}$ = 5.3 mm$^2$/sec) = −31° C.
Asphaltene test with

| 0.025 | 0.05 | 0.075 | 0.1 | 0.125 | 0.15% additive added |
|---|---|---|---|---|---|
| − | + | + | + | + | + |

EXAMPLE 2

Carrier medium: tert-amyl alcohol
OCP swelling: 92% at 90° C.
Emulsifier: AX1

70 g of emulsifier AX1 and 200 g of tert-amyl alcohol were charged into a 1-liter Witt jar with a heavy duty shear stirrer (diameter ratio stirrer/jar: 0.7; two circuit breakers; stirrer speed, about 450 rpm) at 90° C. 250 g of granulated OCP (ethylene/propylene copolymer with 70% ethylene, degraded thermally and oxidatively from a molecular weight of about 150,000 to a molecular weight of about 100,000) were then added in portions, with stirring. Dispersing time: 4 to 5 hours. A white emulsion was obtained. Under a phase contrast microscope, round OCP particles of a diameter ranging from 1 to 5 microns were discernible.
Polymer content = 56.2 percent.
Viscosity (25° C., shear gradient 5 s$^{-1}$) = 4,660 mPa.sec.
Viscosity (40° C., shear gradient 5 s$^{-1}$) = 12,200 mPa.sec.

EXAMPLE 3

Carrier medium: Propyl acetate
OCP: As in Example 2
OCP swelling: 65% at 90° C.
Emulsifier: AX1
Apparatus: As in Example 2
Temperature: 80° C.

50 g of emulsifier AX1 were charged together with 340 g of propyl acetate, 255 g of granulated OCP were added in portions with stirring. A white, low viscosity emulsion with OCP particle diameters ranging from 1 to 10 microns was obtained.
Viscosity (25° C., shear gradient 5 s$^{-1}$) = 30 mPa.sec
Viscosity (40° C., shear gradient 5 s$^{-1}$) = 76 mPa.sec

EXAMPLE 4

Carrier medium: Ethylene glycol acetate
OCP swelling: 23% at 90° C.
Emulsifier: AX2
Apparatus: As in Example 2
Temperature: 110° C.

70 g of emulsifier AX2, 72 g of butyl acetate, and 200 g of ethylene glycol acetate were charged into the Witt jar. 330 g of granulated OCP were then added in portions under a nitrogen atmosphere. Dispersing time: About 4 to 5 hours.
A white emulsion with round OCP particles ranging in diameter from 1 to 5 microns was obtained.
Polymer content = 55.4 percent.
Viscosity (25° C., shear gradient 5 1$^{-1}$) = 706 mPa.sec.
Viscosity (40° C., shear gradient 5 s$^{-1}$) = 1720 mPa.sec.

EXAMPLE 5

Carrier medium: Hexamethylphosphoric triamide
OCP swelling: 21% at 90° C.
Emulsifier: AX2
OCP: As in Example 2
Apparatus: As in Example 2
Temperature: 110° C.

110 g of emulsifier AX2 and 180 g of hexamethylphosphoric triamide were charged into the Witt jar. 260 g of granulated OCP were then added in portions. Dispersing time: 4 to 5 hours.
A gray emulsion was obtained. Particle diameter of the dispersed OCP: 1 to 5 microns.
Polymer content = 59.3 weight percent.
Viscosity (25° C., shear gradient 5 s$^{-1}$) = 4460 mPa.sec.
Viscosity (40° C., shear gradient 5 s$^{-1}$) = 4320 mPa.sec

What is claimed is:

1. A method for making a concentrated emulsion consisting essentially of an olefin copolymer, a liquid carrier medium, and an emulsifier of the formula $$A-X,$$

which method comprises dissolving said emulsifier in said liquid carrier medium and then emulsifying said olefin copolymer therein with shearing forces,
said olefin copolymer being from 20 to 65 percent by weight of the emulsion,
said carrier medium consisting essentially of an ester of higher alcohol having more than 8 carbon atoms which dissolves segment X of said emulsifier and does not dissolve said olefin polymer, but which will swell said olefin polymer to a degree from 5 to 30 percent by weight at a temperature from 40° C. to 150° C., and
said emulsifier A−X being a block or graft copolymer wherein A is a segment of a polymer selected from the group consisting of hydrogenated polyisoprene, hydrogenated butadiene/isoprene, and olefin copolymers formed between alpha olefins having 2 to 20 carbon atoms, and X is at least one segment formed by the polymerization of at least one member selected from the group consisting of acrylate and methacrylate monomers.

2. A method as in claim 1 wherein said carrier medium is one which causes said olefin copolymer to swell to a degree from 5 to 300 weight percent in the temperature range from 40° C. to 150° C.

3. A method as in claim 1 wherein said olefin copolymer is from 30 to 50 weight percent of the emulsion.

4. A method as in claim 1 wherein said emulsifier is from 1 to 30 weight percent of the emulsion.

5. A method as in claim 1 wherein said emulsifier is from 5 to 15 weight percent of the emulsion.

6. A method as in claim 1 wherein the weight ratio of the sequences A and X in said emulsifier is from 1:20 to 20:1.

7. A method for making a concentrated emulsion of an olefin copolymer having dispersing, detergent and pour point depressing action, which method comprises first preparing a copolymer emulsion as in claim 1 and then graft copolymerizing thereon at least one further monomer having a functional group.

8. A method as in claim 7 wherein said monomer has the formula

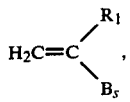

wherein
R₁ is hydrogen or methylene,

B_s is —CN, —CONR₉R₁₀, an inert heterocyclic group, an alkylated inert heterocyclic group, —CH₂OH, or —COO—Q—R₁₁, wherein
Q is alkylene having 2 to 8 carbon atoms,
R₁₁ is —OH, OR₇, or —NR₉R₁₀, wherein
R₇ is alkyl having 1 to 20 carbon atoms,
R₉ and R₁₀, taken alone, are hydrogen or alkyl having 1 to 2 carbon atoms, and
R₉ and R₁₀, taken together with the nitrogen atom to which they are bound, form a five- or six-membered heterocyclic ring.

9. A concentrated emulsion made by the method of claim 1.

10. A concentrated emulsion made by the method of claim 7.

* * * * *